June 17, 1941.   H. C. JENKS   2,246,304
WELDING APPARATUS
Filed Nov. 6, 1937
Fig. 1.
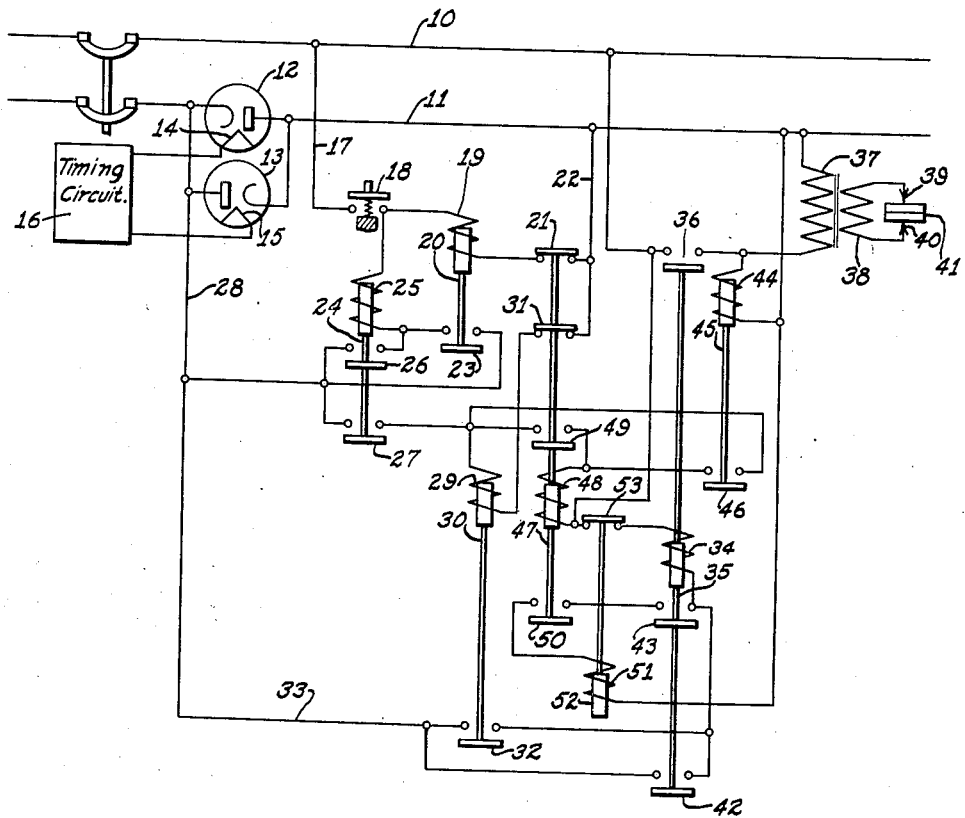
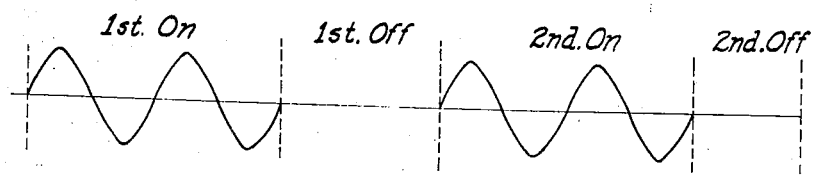
Fig. 2.
WITNESSES:
Leon M. Garman
R W Bailey
INVENTOR
Harold C. Jenks.
BY
F. W. Lyle.
ATTORNEY Patented June 17, 1941

2,246,304

UNITED STATES PATENT OFFICE 2,246,304

WELDING APPARATUS

Harold C. Jenks, Wilkinsburg, Pa., assignor to Westinghouse Electric & Manufacturing Company, East Pittsburgh, Pa., a corporation of Pennsylvania Application November 6, 1937, Serial No. 173,190

2 Claims. (Cl. 175—320)

My invention relates to welding apparatus and especially welding apparatus in which only one group of half cycles is to be applied to one welding load.

An object of the invention is to ensure that the weld will be completed with only a predetermined number of half cycles applied to the welding load.

Other objects and advantages of the invention will be apparent from the following description and drawing in which:

Figure 1 is a diagrammatic circuit view embodying my invention; and

Fig. 2 is a curve illustrating the "on" and "off" periods of alternating current in the welding circuit.

It is desirable to restrict the welding current to a certain number of half cycles, depending upon the type of weld desired. In mass production, it is desirable that these numbers of half cycles be readily available to workmen who may be skilled in the application of the welding contacts to the work or load, but not skilled in the electrical apparatus that produces these groups of half cycles. It is very convenient to have a welding timing circuit set to apply "on" and "off" periods comprising the predetermined and desired group of half cycles for the "on" periods to a bus supply and then to attach any number of bench lines to this bus supply. The bus will then have the welding current in these groups, but it is highly desirable to provide that the weld be made with one group and not with a plurality of groups of these half cycles. My invention contemplates accordingly that the workman depress the switch for his particular bench line, and that the weld will utilize only one group of the desired half cycles.

By means of my invention the weld will not be overshot with more than one group of the desired half cycles. It will be necessary for the workmen to remove the switch in order to get another application of the welding current to the welding contacts.

In Fig. 1, I have disclosed two bus lines 10 and 11 that provide the group of "on" and "off" periods in which the "on" periods contain the desired group of half cycles. These groups are illustrated in Fig. 2 where the first "on," first "off," second "on," and second "off" are illustrated. These periods are accomplished by utilizing two reversely connected discharge tubes 12 and 13 with control electrodes 14 and 15 therein having extensions to a timing circuit 16. This timing circuit and type of tubes may be of any desired arrangement such as that disclosed in the copending application of John W. Dawson, for Welding timing circuits, Serial No. 142,564, filed May 14, 1937.

A connection 17 extends from one of the bus bars 10 to a switch 18 that is preferably in the form of a foot operated switch. This switch 18 upon depression makes contact with the coil 19 of a relay 20. This coil 19 is connected through a closed contact 21 to a connection 22 to the other bus bar 11. When the workman depresses the switch 18, the first "on" period, as illustrated in Fig. 2, provides the actuation of the relay 20. This relay 20 closes contact 23 and actuates the relay 24 by energizing the coil 25 thereof. This relay 24 closes the contacts 26 and 27. The contact 26 closes the coil 25 across the bus bars by means of connection 28 ahead of the tubes 12 and 13. Relay 24 accordingly holds itself in as long as the foot switch 18 is closed. The contact 27 closes the circuit to the coil 29 of relay 30. The coil 29 has a connection through closed contact 31 which is mechaniclly connected to contact 21. Closed contact 31 is connected to bus bar 11.

During the first "off" period, the voltage across the two tubes 12 and 13 will actuate the coil 29 of relay 30 and close the contact 32 in the line 33 from one side of the discharge devices to the coil 34 of the welding contactor relay 35. This welding contactor relay 35 closes the welding contacts 36 in the line extending from one bus bar 10 to the primary 37 of the welding load transformer whose other end is connected to the other bus bar 11. The secondary 38 is connected, of course, to the welding electrodes 39 and 40 applied to the work 41 which is to be welded. This first "off" period following the first "on" period accordingly sets the welding contacts so that on the second "on" period the weld will be made for the desired number of half cycles in accordance with the setting of the timing circuit 16.

During this operation contacts 42 and 43 have been closed in preparation for subsequent actions. The voltage drop across the primary 37 of the welding transformer actuates the coil 44 of the relay 45. This relay closes contact 46 which makes contact to a relay 47 having a coil 48. This relay 47 is mechanically connected to the closed contacts 21 and 31 previously mentioned and the actuation of the coil 48 opens these contacts and thereby prevents further actuation of the welding contact relay 35 because of the interruption at contact 32 on deenergization of the coil 29 of relay 30.

The relay 47 closes contacts 49 and 50 and thus establishes a connection to the coil 51 of relay 52 which has connections across the tubes 12 and 13. The relay 52 opens the contacts at 53 to the welding contactor relay 35 and this opens the connection 36 to the welding transformer 37, 38. There will be no further action until the operator disconnects switch 18 and begins the operations over again.

By my invention a man skilled only in applying welding contacts can depress the switch 18, and no matter how long he applies the electrodes 39 and 40 to the work 41, only one group of the desired number of half cycles will be applied thereto. The work is accordingly protected from an overshot of several groups of half cycles.

Several groups of such bench lines can be attached, of course, to the bus bars 10 and 11.

It is also apparent that many modifications may be made in the number, form and arrangement of the elements forming my preferred embodiment. Accordingly, I desire only such limitations to be applied to the following claims as is necessitated by the prior art.

I claim as my invention:

1. In combination with an alternating-current source and a load to be connected thereto, a pair of normally open contacts between said source and said load, means which becomes periodically conducting and non-conducting between said source and said contacts, a switch, a relay responsive to the conductive state of said means and to the closure of said switch to energize a relay and keep it energized thereafter until said switch is open, a second relay responsive to the energization of the first said relay and to the non-conductive condition of said means to close said normally open contacts, a third relay responsive to the closure of said normally open contacts and to the conductive condition of said means to open said second relay and to retain it in its open condition until the first said relay opens.

2. In combination with a circuit comprising a load and a pair of normally open contacts in series therewith, means for supplying voltage to said circuit in periods which are separated by intervals of no voltage, a switch, a relay responsive to the closed condition of said switch during one of said periods to close a circuit, a second relay responsive to the closure of the last-mentioned circuit and to an interval of no voltage to close said normally open contacts, and a third relay responsive to the closed condition of said normally open contacts in one of said periods to open said second relay and to retain it open until after said switch has been opened.

HAROLD C. JENKS.